Jan. 20, 1959  L. J. CARTER  2,870,277
RECONSTITUTED MICA HEATING ELEMENT
Filed March 7, 1957

Fig. 1.
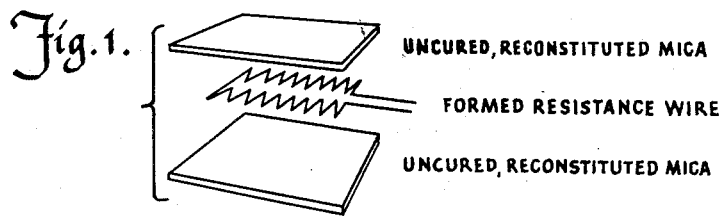
UNCURED, RECONSTITUTED MICA
FORMED RESISTANCE WIRE
UNCURED, RECONSTITUTED MICA Fig. 2.
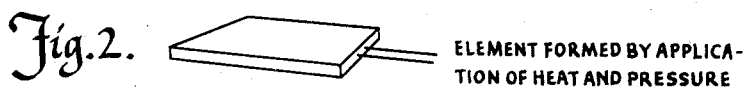
ELEMENT FORMED BY APPLICATION OF HEAT AND PRESSURE Fig. 3.
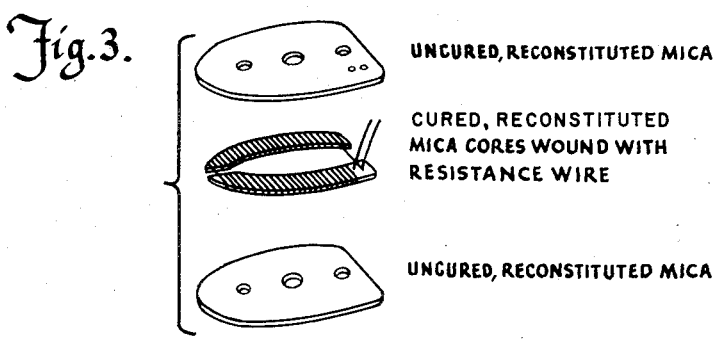
UNCURED, RECONSTITUTED MICA
CURED, RECONSTITUTED MICA CORES WOUND WITH RESISTANCE WIRE
UNCURED, RECONSTITUTED MICA Fig. 4.
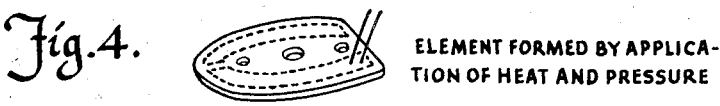
ELEMENT FORMED BY APPLICATION OF HEAT AND PRESSURE Larry J. Carter
INVENTOR.

BY *Albin F. Knight*
ATTORNEY

United States Patent Office 2,870,277
Patented Jan. 20, 1959

2,870,277

RECONSTITUTED MICA HEATING ELEMENT

Larry J. Carter, Arden, N. C., assignor to Farnam Manufacturing Company, Inc., Asheville, N. C., a corporation of North Carolina Application March 7, 1957, Serial No. 644,662

4 Claims. (Cl. 200—19)

This invention relates to electrical heating elements and more particularly, it relates to a unitary heating element comprising an electric resistance unit completely enclosed and insulated, suitable for use in electrical appliances and the like.

Electric heating elements composed of a length of a bare ribbon or wire of resistance metal positioned between unbound sheet mica or other insulating and refractory material are widely used in appliances and industrial heating applications.

It is an object of the present invention to provide an improved electrical heating element and a method of producing the same.

Another object is to provide an electrical heating element characterized by efficient heat transfer properties and having increased wire life.

Another object is to provide an electrical heating element which may be readily installed or replaced in an electrical appliance or the like.

Still another object is to provide a process for manufacturing an electrical heating element which in use will reduce assembly costs.

Other objects will be made clear from the following description when taken in conjunction with the attached drawings, wherein:

Figure 1 is an exploded view showing the parts of a heating element to be made in accordance with the invention;

Figure 2 is a perspective view of a finished heating element made from the parts shown in Figure 1 in accordance with the invention;

Figure 3 is an exploded view showing the parts of a heating element made in accordance with a modification of the present invention;

Figure 4 is a perspective view of a finished heating element made in accordance with the invention from the parts shown in Figure 3.

In general, the improved heating element of the invention is made by positioning a length of resistance wire or the like between two layers of uncured reconstituted mica containing a suitable bonding agent and applying heat and pressure to the "sandwich" thus formed to cure the reconstituted mica and bond the two layers together into a unitary assemblage enclosing the resistance wire. Preferably, the uncured reconstituted mica that is used contains a binder of mono-aluminum dihydrogen phosphate.

The uncured reconstituted mica members used in the practice of the present invention may be made by the methods described in U. S. Patent No. 2,760,879 to McDaniel et al. and the specification of that patent is incorporated herein by reference. Suitable bonding agents other than those described in this patent, however, might be used to good advantage in carrying out the present invention. For example, see Patents Nos. 2,405,884 and 2,420,475.

*Example I*

The following example will illustrate the first embodiment of the invention. Referring now to Figure 1, there is shown a bottom layer and a top layer of reconstituted mica sheet. Each of these layers may be formed according to the procedures described in the above referred to Patent No. 2,760,879, except that the sheetmaking process is carried through the drying step and then, instead of pressing and curing, the dried sheet is punched into the desired shape of the bottom and top layer shown in Figure 1. For another specific illustration, in the present example each of these layers is formed by the following procedure. Shop scrap mica is ground in a hammer mill so that all flakes pass a standard 20 mesh screen. The flakes are then passed over a 200 mesh screen to remove particles smaller than 200 mesh, which are discarded. The resulting product, consisting of mica flakes less than 20 mesh but more than 200 mesh in size, are then added to a 30% water solution of mono-aluminum dihydrogen phosphate. Sufficient solution is used to produce a slurry containing about 5% (by weight) mica solids. This slurry, while being stirred constantly to maintain the mica particles in even dispersion, is pumped onto a screen covered filter box from which the air can be evacuated. After an even layer of mica and slurry have covered the screen surface, a vacuum is applied beneath the screen, drawing excess liquid out of the mica and leaving a moist layer of mica on the screen. This layer is then removed and placed under drying lamps at a temperature of 250°–300° F. for about twenty minutes to remove water. The resulting sheet of uncured mica, containing about 25% binder and about 5% water, with the remainder being flake mica, is cut to size by means of a steel rule die and is ready for use in the present invention. The shaped layers shown in Figure 1 are about 5 inches by 3 inches, and are about 1/40 of an inch thick before assembling.

The resistance wire shown in Figure 1, is composed of nickel-chromium wire, 0.015 inch in diameter, and is preformed by any suitable technique known in the art into the shape shown. It will be understood that in practicing this invention a resistance wire or ribbon of a proper size and length to achieve the desired wattage will always be selected.

The heating element is formed in a jig provided with metal plates having surfaces which properly locate the various members with respect to one another. The jig is prepared by laying a sheet of aluminum foil as a strippable release agent on the lower plate of the jig. The bottom layer of uncured reconstituted mica is placed on the aluminum foil and the preformed resistance wire is laid on next. Then the top layer of uncured reconstituted mica is placed on top of the resistance wire and properly located. The top layer of reconstituted mica is covered with a second sheet of aluminum foil and the top plate of the jig is then set in place. The jig assembly is then placed in a heated platen press and pressure is applied. A pressure of 2000 p. s. i. and a temperature of 600° F. is maintained for 45 minutes. During this curing operation the top and bottom layers of mica sheet become firmly bonded to one another, enclosing the resistance wire. This results in the soft, loosely constituted top and bottom layers becoming an integral solid body of insulating material containing resistance wire enclosed therein in air-tight union.

When the curing operation is completed, the jig is removed from the press, taken apart and the heating element removed. The thickness of the heating element is about .070 inch. The foil is stripped from the heating element and the edges smoothed in any suitable manner to remove any loose adhering mica flakes. The heating element, as shown in Figure 2, is now complete and ready for use.

*Example II*

This example will illustrate another embodiment of the invention resulting in the production of the heating element shown in Figures 3 and 4. In some types of heating elements it is necessary to provide a core or arbor member on which the resistance wire is wound. The wound arbor is then inserted between layers of reconstituted mica to form an insulated heating element having the desired electrical characteristics.

A suitable winding arbor is prepared by first manufacturing reconstituted mica board by the process described in Example 4 of Patent No. 2,760,879, the process being carried through all of the necessary steps, i. e., grinding, classifying, mixing with binder of aluminum phosphate compound, forming sheet, drying and subjecting to heat and pressure to cure. The sheet thus formed, about 0.020 inch thick, is punched by compound dies into the shape of the arbor members or cores shown in Figure 3. These shaped members are about 1 inch wide and about 5 inches in overall length. Two separate identical arbors are prepared.

The two arbors thus prepared are then used as a winding support for previously selected and cut resistance wire composed of nickel-chromium ribbon, 3/64 inch by 0.004 inch thick and having a length of about 9 feet. This winding operation is usually carried out manually although any suitable winding technique may be employed. The wound arbors are shown in Figure 3.

The cover members for the heating element are initially prepared similar to the top and bottom layers of Example I above, i. e., through the drying step but without subjecting to heat and pressure to cure the sheet mica. The dried uncured sheet is cut wtih a steel rule die into suitably shaped top and bottom layer members as shown in Figure 3. (Note that the top member is provided with openings for the lead wires.) When ready for use, these members have a thickness of about 0.090 inch, are about 3½ inches wide at the broad end and are about 5½ inches in length through the center.

The top and bottom members and the wound arbors or cores are then assembled in a suitable jig, the metal plates of which are provided with protruding pins which cooperate with the openings shown in the top and bottom members to properly locate the elements with reference to each other. The other jig preparation details of Example I are used. The jig assembly is placed in a heated platen press and a pressure of 2000 p. s. i. and a temperature of 600° F. is applied for about 45 minutes. In this curing operation the top and bottom layers become firmly bonded to one another and to the arbor members. The result is the rigid, integral, insulated and enclosed heating element shown in Figure 4. This element is about 0.075 inch thick. After removing from the jig and smoothing the edges, the completed element is ready for use in an electrical appliance such as an electric iron.

*Example III*

This example will illustrate the production of a completely enclosed circular heating element useful, for example, in an electric frying pan or the like. Two uncured cover members about 15 inches by 24 inches are prepared in similar fashion to the top and bottom layers of Example I. The uncured sheets have a thickness of about 0.090 inch. These sheets are then assembled between the plates of a platen press with six equally spaced preformed resistance units disposed between the sheets. The six resistance units are located in two rows of three units each. Each of these resistance units contains about 10 feet of 22 gauge (0.0253 inch in diameter) sinuated wire composed of 4% aluminum, 40% chromium, with the balance being iron.

The plates of the platen press are then subjected to a pressure of 2000 p. s. i. and a temperature of 600° F. for about 45 minutes. During this curing operation the top and bottom sheets becomes firmly bonded to one another enclosing the six resistance units. The cured assembly is removed from the press and six separate circular heating elements are cut from the assembly by means of a compound die punching operation. The finished circular elements, each with a completely enclosed resistance unit and protruding lead wires, are about 7 inches in diameter.

*Example IV*

A larger heating element is made by preparing two uncured mica sheets about 18 inches by 12 inches in the same manner as in the foregoing examples. These uncured sheets, about 0.10 inch thick, are placed in a platen press between sheets of aluminum foil with a preformed sinuated resistance wire disposed between the two uncured sheets. The wire used is 23 gauge (0.0226 inch in diameter) composed of 4% aluminum, 40% chromium, with the remainder iron. The unit contains about 20.8 feet of this wire.

With the assembly in place, a pressure of 2000 p. s. i. and a temperature of 700° F. is applied to the press to bond the two mica sheets rigidly together and enclose the resistance wire. After about 45 minutes the finished element is removed from the press, the foil is stripped away and the edges smoothed to remove loose flakes of mica. The resulting 80 mils thick heating element with a capacity of 1500 watts at 230 volts, is ready for use.

The heating elements of the present invention have numerous advantages. The use of these elements reduces labor costs in assembling electrical appliances because the element is an integral unit ready for insertion in the appliance with no need to adjust layers of mica, heating wires, etc. These heating elements provide more efficient heat transfer because the mica is molded around the resistance wire. Since the resistance wire is sealed from oxygen and the atmosphere, these heating elements have a longer life than conventional types. Another advantage of these elements is that the various coils of the resistance wire are maintained in place eliminating the possibility of shifting or contacting in use, which of course, tend to shorten the life of the heating element. The heating elements of the invention obviously simplify the replacement of heating elements in the repair of electrical appliances. Since there are no open spaces to retain water or no moisture these heating elements are more moisture resistant than the more commonly used types. Another advantage is that it employs scrap mica from punching operations and readily available domestic mica without recourse to foreign markets.

While specific embodiments of the invention have been described, they are to be taken as illustrative rather than limiting and it is to be understood that the scope of the invention is set forth in the following claims.

What is claimed is:

1. A method for manufacturing an embedded electric element comprising the steps of substantially drying sheets of uncured reconstituted mica, shaping the dried sheets into the required form, disposing an electrically conductive element between two of said sheets, and subjecting the assembly to a temperature of at least 250° C., while applying a pressure of at least 100 p. s. i. for at least ten minutes to cure and bond the sheets and thereby seal said conductive element in airtight engagement therewith.

2. A method for manufacturing an embedded electric element comprising the steps of substantially drying sheets of uncured reconstituted mica containing a binder of mono-aluminum dihydrogen phosphate, shaping the dried sheets into the required form, disposing an electrically conductive element between two of said sheets, and subjecting the assembly to a temperature of at least 250° C. while applying a pressure of at least 100 p. s. i. for at least ten minutes to cure and bond the sheets and thereby seal said conductive element in airtight engagement therewith.

3. A method for manufacturing an electrical heating element comprising the steps of winding an electric resistance wire around a shaped reconstituted mica core member, substantially drying sheets of uncured reconstituted mica, shaping the dried sheets into the required form, disposing said core member between two of said sheets, and subjecting the assembly to a temperature of at least 250° C., while applying a pressure of at least 100 p. s. i. for at least ten minutes to cure and bond the sheets and thereby seal said conductive element in airtight engagement therewith.

4. A method for manufacturing an electrical heating element comprising the steps of winding an electric resistance wire around shaped reconstituted mica core members containing a binder of mono-aluminum dihydrogen phosphate, substantially drying sheets of uncured reconstituted mica, shaping the dried sheets into the required form, disposing said core members between two of said sheets, and subjecting the assembly to a temperature of at least 250° C. while applying a pressure of at least 100 p. s. i. for at least ten minutes to cure and bond the sheets and thereby seal said conductive element in airtight engagement therewith.

References Cited in the file of this patent

UNITED STATES PATENTS

| | | |
|---|---|---|
| 1,398,410 | Wiegand | Nov. 29, 1921 |
| 1,655,857 | Cunard | Jan. 10, 1928 |
| 2,472,533 | Heyman | June 7, 1949 |
| 2,553,762 | Gyuris | May 22, 1951 |
| 2,660,659 | Sarno | Nov. 24, 1953 |
| 2,721,153 | Hope et al. | Oct. 18, 1955 |
| 2,760,879 | McDaniel et al. | Aug. 28, 1956 |
| 2,791,668 | Cowdrey et al. | May 7, 1957 |